C. THIERY.
Ornamental Chains.
No. 161,297.  Patented March 23, 1875.
Fig: 1.
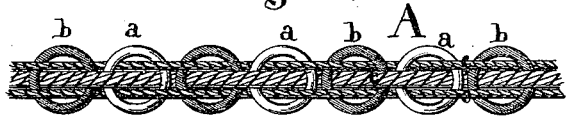
Fig: 2.
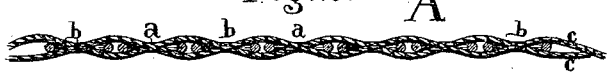
Fig: 3.
Fig: 4.
Witnesses:  Inventor:

UNITED STATES PATENT OFFICE.

CHARLES THIÉRY, OF NEWARK, NEW JERSEY.

IMPROVEMENT IN ORNAMENTAL CHAINS.

Specification forming part of Letters Patent No. 161,297, dated March 23, 1875; application filed August 26, 1874.

*To all whom it may concern:*

Be it known that I, CHARLES THIÉRY, of Newark, in the county of Essex and State of New Jersey, have invented a certain new and useful Improvement in Ornamental Chains, of which the following is a specification:

This invention consists in a chain composed of a series of separate main rings or links, which are united by secondary chains passed through said main rings or links in such a manner that the operation of constructing a chain of links having partly dull or plain and partly polished or enameled surfaces is materially facilitated, and ornamental chains of great variety can be produced with comparatively little labor.

This invention is illustrated in the accompanying drawing, in which Figure 1 represents a plan or top view. Fig. 2 is a sectional side view. Fig. 3 is a plan of a modification of the same. Fig. 4 is a sectional side view thereof.

Similar letters indicate corresponding parts.

In the drawing, the letter A designates a chain composed of a series of main links or rings, $a\ b$, which are connected together by means of two or more secondary chains, $c$, passed through them, in the manner shown in the drawing, or in any manner which will produce the same effect. The links or rings $a\ b$ may be made of any desirable form or size, and they may be made all of the same material, or the rings $a$ may be made, for instance, of gold and the rings $b$ of platina or silver, or one set of rings may be of platina and the other of silver or of black oxidized silver.

By constructing a chain of separate rings united by secondary chains I can also produce chains the links of which are alternately dull and polished without difficulty.

By the old system chains of alternately dull and polished rings can only be constructed with much and tedious labor, since the rings have to be first interlaced or linked together; then the entire chain has to be dipped in acid to render the links dull, and finally the alternate links have to be polished, one by one, by a very tedious and difficult process; and, furthermore, by dipping the whole chain in acid a loss of material is produced, which is avoided by my invention.

According to my process the links are either polished or dipped in acid before they are united by the secondary chains, and a saving of at least fifty per cent. in labor is effected, while at the same time the polished links are not dipped in acid, and consequently their full weight is preserved.

My invention is applicable to chains of any description. The links may be polished or dull, engraved, stamped, or enameled; and said chains may be used for necklaces, for watch-chains, for bracelets, or for any other desirable purpose.

What I claim as new, and desire to secure by Letters Patent, is—

An ornamental chain composed of a series of separate rings or links, $a\ b$, united by secondary chains $c$ passed through said main rings or links, substantially in the manner herein shown and described.

In testimony that I claim the foregoing I have hereunto set my hand and seal this 20th day of August, 1874.

C. THIÉRY. [L. S.]

Witnesses:
 W. HAUFF,
 E. F. KASTENHUBER.